US012573053B2

(12) United States Patent
Zhu et al.

(10) Patent No.: US 12,573,053 B2
(45) Date of Patent: Mar. 10, 2026

(54) IMAGE SHADOW DETECTION METHOD AND SYSTEM, AND IMAGE SEGMENTATION DEVICE AND READABLE STORAGE MEDIUM

(71) Applicant: Suzhou Cleva Precision Machinery & Technology Co., Ltd., Suzhou City (CN)

(72) Inventors: Shaoming Zhu, Suzhou City (CN); Xue Ren, Suzhou City (CN)

(73) Assignee: Suzhou Cleva Precision Machinery & Technology Co., Ltd., Suzhou (CN)

( * ) Notice: Subject to any disclaimer, the term of this patent is extended or adjusted under 35 U.S.C. 154(b) by 369 days.

(21) Appl. No.: 18/043,797

(22) PCT Filed: Oct. 28, 2020

(86) PCT No.: PCT/CN2020/124360
§ 371 (c)(1),
(2) Date: Mar. 2, 2023

(87) PCT Pub. No.: WO2022/047961
PCT Pub. Date: Mar. 10, 2022

(65) Prior Publication Data

US 2024/0020845 A1 Jan. 18, 2024

(30) Foreign Application Priority Data

Sep. 2, 2020 (CN) ......................... 202010907601.6

(51) Int. Cl.
*G06T 7/136* (2017.01)
*A01B 69/00* (2006.01)
(Continued)

(52) U.S. Cl.
CPC .............. *G06T 7/12* (2017.01); *A01B 69/001* (2013.01); *A01D 34/008* (2013.01); *G06T 7/90* (2017.01);
(Continued)

(58) Field of Classification Search
None
See application file for complete search history.

(56) References Cited

U.S. PATENT DOCUMENTS

2005/0141002 A1* 6/2005 Takano ..................... G06T 5/94 358/1.9
2021/0136993 A1* 5/2021 Revelli .................. A01D 75/00

FOREIGN PATENT DOCUMENTS

CN 101833749 A * 9/2010 ......... G06K 9/00771
CN 103295013 A 9/2013
(Continued)

OTHER PUBLICATIONS

A histogram specification technique for dark image enhancement using a local transformation method Hussain et al. (Year: 2018).*
(Continued)

*Primary Examiner* — Andrew M Moyer
*Assistant Examiner* — Dylan John Mendez Muniz
(74) *Attorney, Agent, or Firm* — JK Intellectual Property Law, PA

(57) ABSTRACT

Disclosed is an image shadow detection method, a system, an image segmentation device, and a readable storage medium. The method comprises the following steps: acquiring a chrominance component of an image; segmenting the image by a first segmentation rule based on the chrominance components of the image and the preset chrominance interval and acquiring a first segmentation result, the first segmentation result comparing a first region and a second region; calculating feature values of the first region or the
(Continued)

second region in the image; carrying out the comparison processing to judge whether the image has shadow based on the feature value and the preset threshold value. According to the present disclosure, the image is segmented by the first segmentation rule and the first segmentation result is acquired. The first segmentation result is acquired based on the chrominance component and is not affected by shadows. The shadow area is identified by combining the first segmentation result with the judgment of feature values, thus reducing the possibility of shadow misjudgment.

9 Claims, 11 Drawing Sheets

(51) Int. Cl.

| | |
|---|---|
| ***A01D 34/00*** | (2006.01) |
| ***G06T 7/12*** | (2017.01) |
| ***G06T 7/90*** | (2017.01) |
| ***G06V 10/26*** | (2022.01) |
| ***G06V 10/28*** | (2022.01) |
| ***G06V 10/32*** | (2022.01) |
| ***G06V 10/44*** | (2022.01) |
| ***G06V 10/50*** | (2022.01) |
| ***G06V 10/56*** | (2022.01) |
| ***G06V 10/60*** | (2022.01) |
| ***G06V 10/75*** | (2022.01) |
| ***G06V 20/50*** | (2022.01) |
| *A01D 101/00* | (2006.01) |

(52) U.S. Cl.

CPC .............. *G06V 10/32* (2022.01); *G06V 10/44* (2022.01); *G06V 10/56* (2022.01); *G06V 10/60* (2022.01); *G06V 10/751* (2022.01); *G06V 20/50* (2022.01); *A01D 2101/00* (2013.01)

(56) References Cited

FOREIGN PATENT DOCUMENTS

| | | | | | |
|---|---|---|---|---|---|
| CN | 105913441 A | | 8/2016 | |
| CN | 107846583 B | * | 9/2020 | ............. H04N 9/646 |
| CN | 108734676 B | * | 12/2020 | ............. G06T 5/005 |
| WO | WO-2020073739 A1 | * | 4/2020 | ............. G06F 21/84 |

OTHER PUBLICATIONS

International Search Report for Application No. PCT/CN2020/0124360, dated May 31, 2021.

* cited by examiner

S20

S201

GENERATE A FIRST COLOR COMPONENT HISTOGRAM BASED ON THE CHROMINANCE COMPONENT

S202

FILTER AND SMOOTH THE FIRST COLOR COMPONENT HISTOGRAM TO ACQUIRE A SECOND COLOR COMPONENT HISTOGRAM

S203

DETERMINE THE PEAK AND THE VALLEY IN THE SECOND COLOR COMPONENT HISTOGRAM BASED ON THE PRESET CHROMINANCE INTERVAL AND THE PRESET PEAK AND VALLEY SETTING CONDITIONS

S204

ACQUIRE A FIRST SEGMENTATION THRESHOLD BASED ON THE PEAK AND THE VALLEY

S205

SEGMENT THE IMAGE BASED ON A FIRST SEGMENTATION THRESHOLD AND ACQUIRE A FIRST SEGMENTATION RESULT

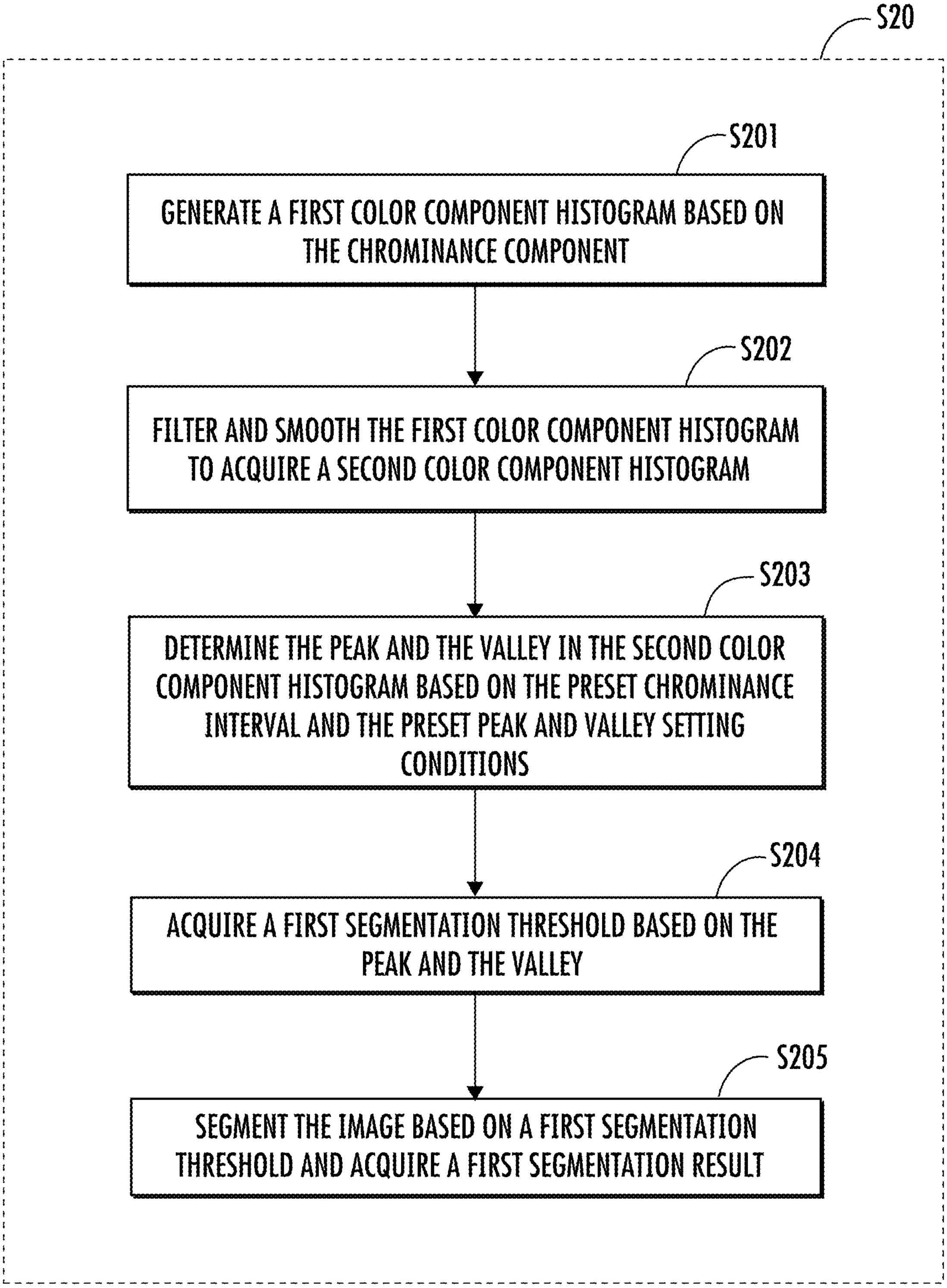

ACQUIRE THE CHROMINANCE COMPONENT OF LAWN IMAGE

S120

SEGMENT THE LAWN IMAGE BY A FIRST SEGMENTATION RULE BASED ON THE CHROMINANCE COMPONENT OF THE LAWN IMAGE AND A PRESET LAWN CHROMINANCE INTERVAL AND ACQUIRE A FIRST SEGMENTATION RESULT

S130

CALCULATE A FEATURE VALUE OF THE LAWN IMAGE RELATIVE TO THE FIRST SEGMENTATION RESULT

S140

CARRY OUT THE COMPARISON PROCESSING TO JUDGE WHETHER THE IMAGE HAS SHADOWS BASED ON THE FEATURE VALUE AND THE PRESET THRESHOLD VALUE

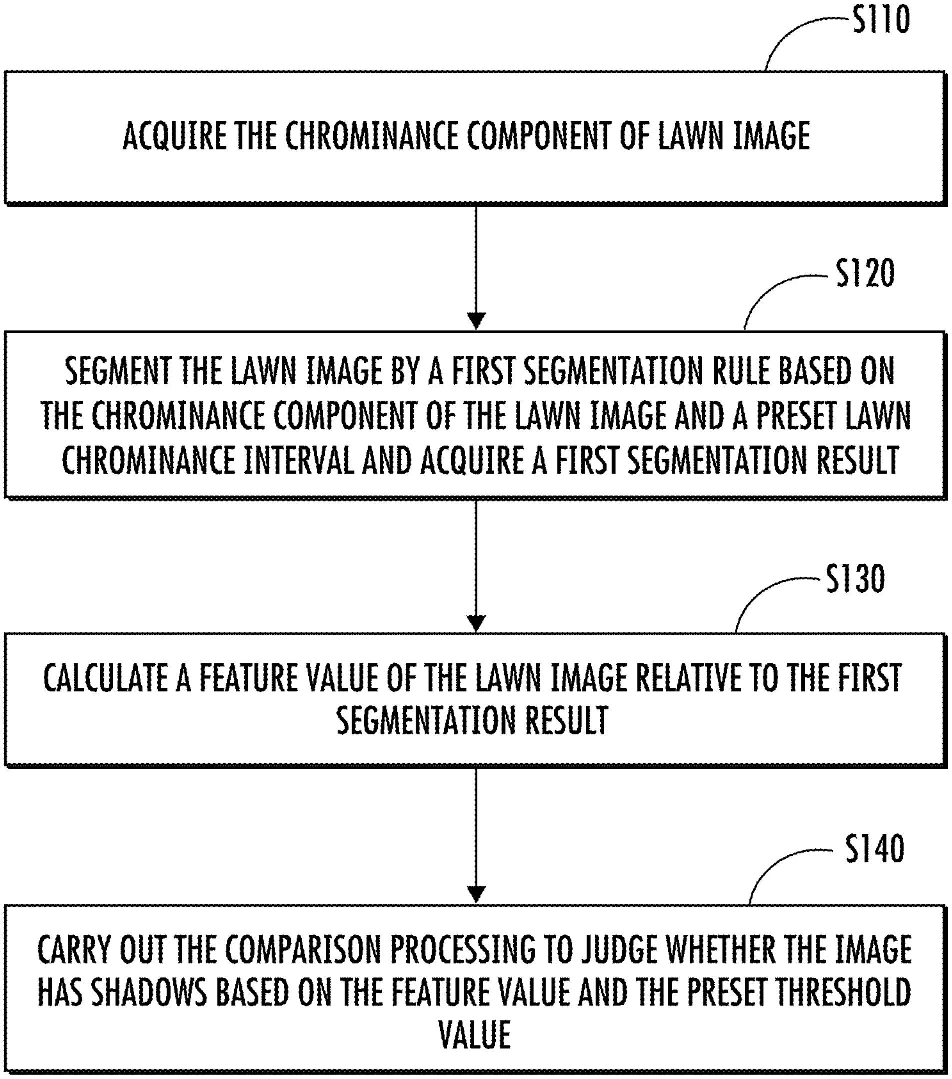

FIG. 6

IMAGE SHADOW DETECTION METHOD AND SYSTEM, AND IMAGE SEGMENTATION DEVICE AND READABLE STORAGE MEDIUM

CROSS-REFERENCE TO RELATED PATENT APPLICATIONS

This application is a national stage of International Application No. PCT/CN2020/124360, filed on Oct. 28, 2020, which claims priority to CN patent application No. 202010907601.6, filed on Sep. 2, 2020. All of the aforementioned applications are hereby incorporated by reference in their entireties.

TECHNICAL FIELD

The present disclosure relates to an image shadow detection method, a system, an image segmentation device, and a readable storage medium, in particular to an image shadow detection method, a system, an image segmentation device and a readable storage medium for effectively reducing shadow misjudgment.

BACKGROUND

At present, the commonly used shadow detection methods are divided into two categories: methods based on geometric models and methods based on shadow features. The method based on geometric model is to build shadow model by using the prior information of scene, moving object and illumination conditions, which is usually used in specific scenes. The method based on shadow features is to identify the shadow region by using the geometric features, brightness, color, texture and other information, among which color and texture are the two most widely used properties at present. However, the existing shadow detection methods have some limitations, and often misjudge the lawn in shadow area or the lawn under strong light as a non-lawn area.

SUMMARY

The present disclosure provides an image shadow detection method, a system, an image segmentation device, and a readable storage medium for effectively reducing shadow misjudgment.

The present disclosure provides an image shadow detection method; the method comprises the following steps:

- acquiring a chrominance component of the image;
- segmenting the image by a first segmentation rule based on the chrominance component of the image and a preset chrominance interval and acquiring a first segmentation result;
- calculating a feature value of the image relative to the first segmentation result;
- carrying out the comparison processing to judge whether the image has shadow based on the feature value and the preset threshold value.

Alternatively, after the carrying out the comparison processing to judge whether the image has shadow based on the feature value and the preset threshold value, the method comprises: carrying out the corresponding image processing based on the judgment result, the carrying out the corresponding image processing based on the judgment result comprising: if the judgment result is that there is a shadow, segmenting the image by a second segmentation rule based on the chrominance component of the image and a preset chrominance interval to acquire a second segmentation result, and taking the second segmentation result as the final segmentation result; if the judgment result is that there is no shadow, taking the first segmentation result as the final segmentation result.

Alternatively, the first segmentation result comprises a first region and a second region, and the feature value comprises any one or a combination of a first average luminance value of the first region, a second average luminance value of the second region, a luminance difference between the first average luminance value and the second average luminance value, a first roughness value of the first region, a second roughness value of the second region, or the roughness ratio of the first roughness value and the second roughness value, and each feature value is provided with a corresponding preset threshold value, wherein, the carrying out the comparison processing to judge whether the image has shadow based on the feature value and the preset threshold value comprises the comparison processing based on each feature value and the corresponding preset threshold value, and judging whether the image has a shadow based on any comparison result or a combination comparison result.

Alternatively, the acquiring the chrominance component of the image comprises:

- acquiring HSV image;
- carrying out the separation processing on the HSV image and acquiring an H-channel image and a V-channel image, wherein the H-channel image comprises a chrominance component and the V-channel image comprises a luminance component.

Alternatively, the calculating a feature value of the image relative to the first segmentation result comprises: calculating a first average luminance value of the first region, a second average luminance value of the second region, and the luminance difference between the first average luminance value and the second average luminance value based on luminance components of the first region or the second region.

Alternatively, the calculating a feature value of the image relative to the first segmentation result comprises:

- pre-processing the V-channel image to acquire a pre-processed image, wherein the pre-processing comprises filtering processing and normalization processing;
- performing edge extraction on the pre-processed image to acquire an edge image;
- calculating a first roughness value of the first region, a second roughness value of the second region, and a roughness ratio of the first roughness value to the second roughness value in the edge image.

The present disclosure also provides a walking control method of the intelligent lawn mower, comprising the following steps:

- acquiring the chrominance component of lawn image;
- segmenting the lawn image by a first segmentation rule based on the chrominance component of the lawn image and a preset lawn chrominance interval and acquiring a first segmentation result;
- calculating a feature value of the lawn image relative to the first segmentation result;
- carrying out the comparison processing to judge whether the image has shadows based on the feature value and the preset threshold value;
- carrying out the corresponding image processing based on the judgment result to control the walking direction of the intelligent lawn mower.

The present disclosure also provides an image shadow detection system, comprising:

a chrominance component acquisition module for acquiring a chrominance component of an image;

an image segmentation module for segmenting the image by a first segmentation rule based on the chrominance component of the image and a preset chrominance interval and acquiring a first segmentation result;

a feature processing module for calculating a feature value of the image relative to the first segmentation result;

a shadow identification module for carrying out the comparison processing to judge whether the image has shadows based on the feature value and the preset threshold value.

The present disclosure also provides an image processing device, comprising a memory and a processor, the memory having a computer program stored therein, when the processor executes the computer program, implementing the steps of the image shadow detection method.

The present disclosure also provides a readable storage medium, having stored therein a computer program, when executed by the processor, the computer program implements the steps of the image shadow detection method.

Compared with the prior art, according to the present disclosure, segmentation processing is performed on an image by a first segmentation rule and a first segmentation result is acquired, wherein the first segmentation result is acquired based on the chrominance component and is not affected by shadows, and the shadow area is identified by combining the first segmentation result with the judgment of feature values, thus reducing the possibility of shadow misjudgment. According to the present disclosure, corresponding image processing is carried out based on the judgment result, the segmentation processing is carried out by selecting the second segmentation rule under the condition of shadow, and segmentation processing is carried out by selecting the first segmentation rule under the condition of no shadow, so that the final segmentation result is not affected by shadow, thereby reducing the possibility of false segmentation. According to the present disclosure, whether the image has shadow is judged by the combined comparison result of a plurality of feature values, and the possibility of shadow misjudgment is reduced. According to the present disclosure, the segmentation threshold is acquired based on the peak and the valley, the segmentation threshold may be dynamically adjusted based on different images, and the fixed segmentation threshold is no longer used, thereby effectively reducing false segmentation. According to the present disclosure, filtering processing and smoothing processing are performed on the chrominance component histogram, interference signals in the chrominance component histogram is reduced, thereby further reducing false segmentation. According to the present disclosure, based on the preset chrominance interval and the preset peak-valley setting conditions, the peak and the valley in the chrominance component histogram are determined, so as to improve the speed of identifying the peak and the valley.

BRIEF DESCRIPTION OF THE DRAWINGS

FIG. 4 is a flowchart of S20 in FIG. 1;

FIG. 6 is a flowchart of the image shadow detection method of the present disclosure;

DETAILED DESCRIPTION

In order for those skilled in the art to have a better understanding of the technical solutions of the present disclosure, a clear and complete description of the technical solutions of the embodiments of the present disclosure will be given below in conjunction with the accompanying drawings in the embodiments of the present disclosure, and it will be apparent that the described embodiments are only part of the embodiments of the present disclosure, not all of them. On the basis of the embodiments in the present disclosure, all other embodiments acquired by those skilled in the art without making creative efforts should fall within the scope of protection of the present disclosure.

Figure 1:
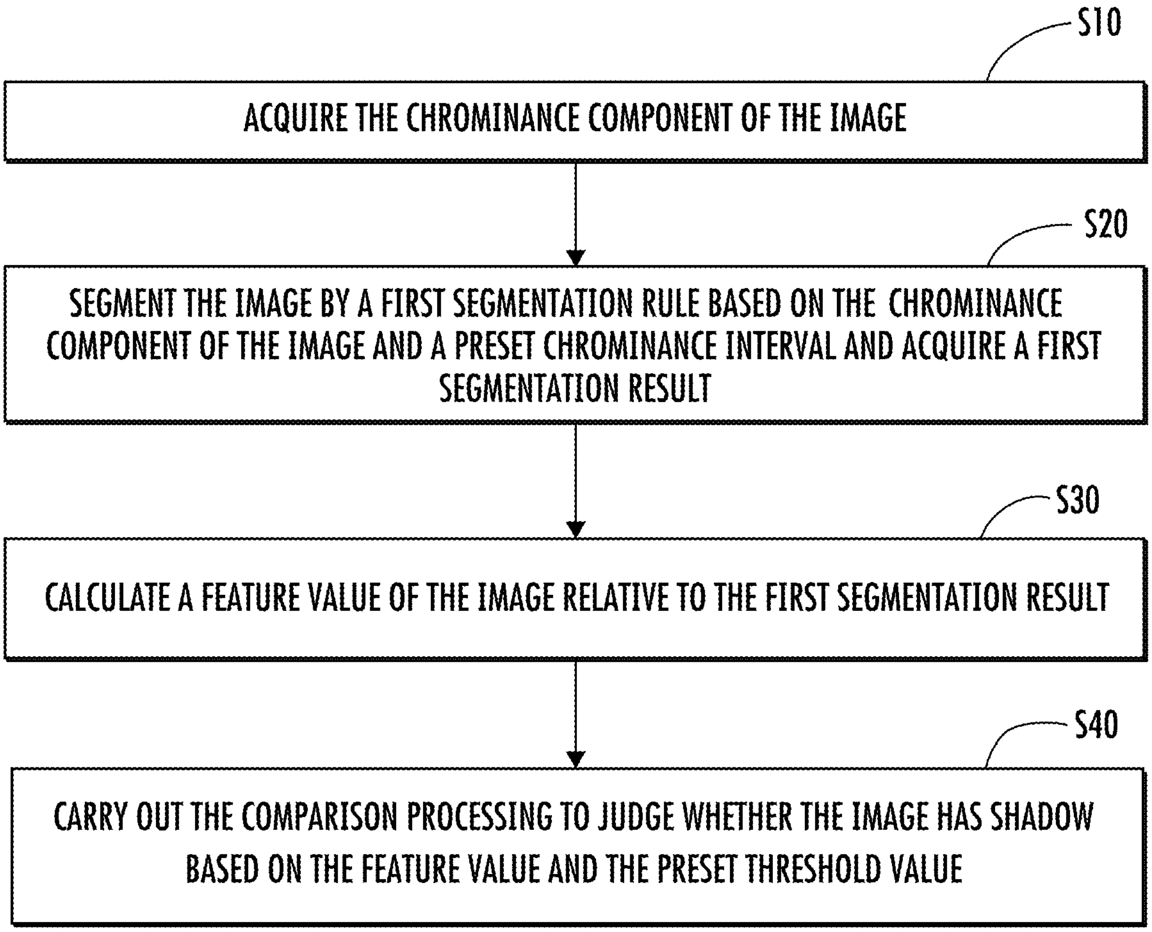
FIG. 1 is a flowchart of a first embodiment of an image shadow detection method of the present disclosure.

Referring to FIG. 1, an image shadow detection method, a system, an image segmentation apparatus, and a readable storage medium effectively reducing shadow misjudgments.

The disclosure provides an image shadow detection method; the method comprises the following steps:

S10: acquiring the chrominance component of the image;

S20: segmenting the image by a first segmentation rule based on the chrominance component of the image and a preset chrominance interval and acquiring a first segmentation result;

S30: calculating a feature value of the image relative to the first segmentation result;

S40: carrying out the comparison processing to judge whether the image has shadow based on the feature value and the preset threshold value.

The chrominance component in the S10 may be acquired directly or indirectly, the chrominance component in the HSV image may be acquired directly after separation, and the chrominance component of an image such as RGB may be acquired after processing such as color space conversion.

Figure 2:
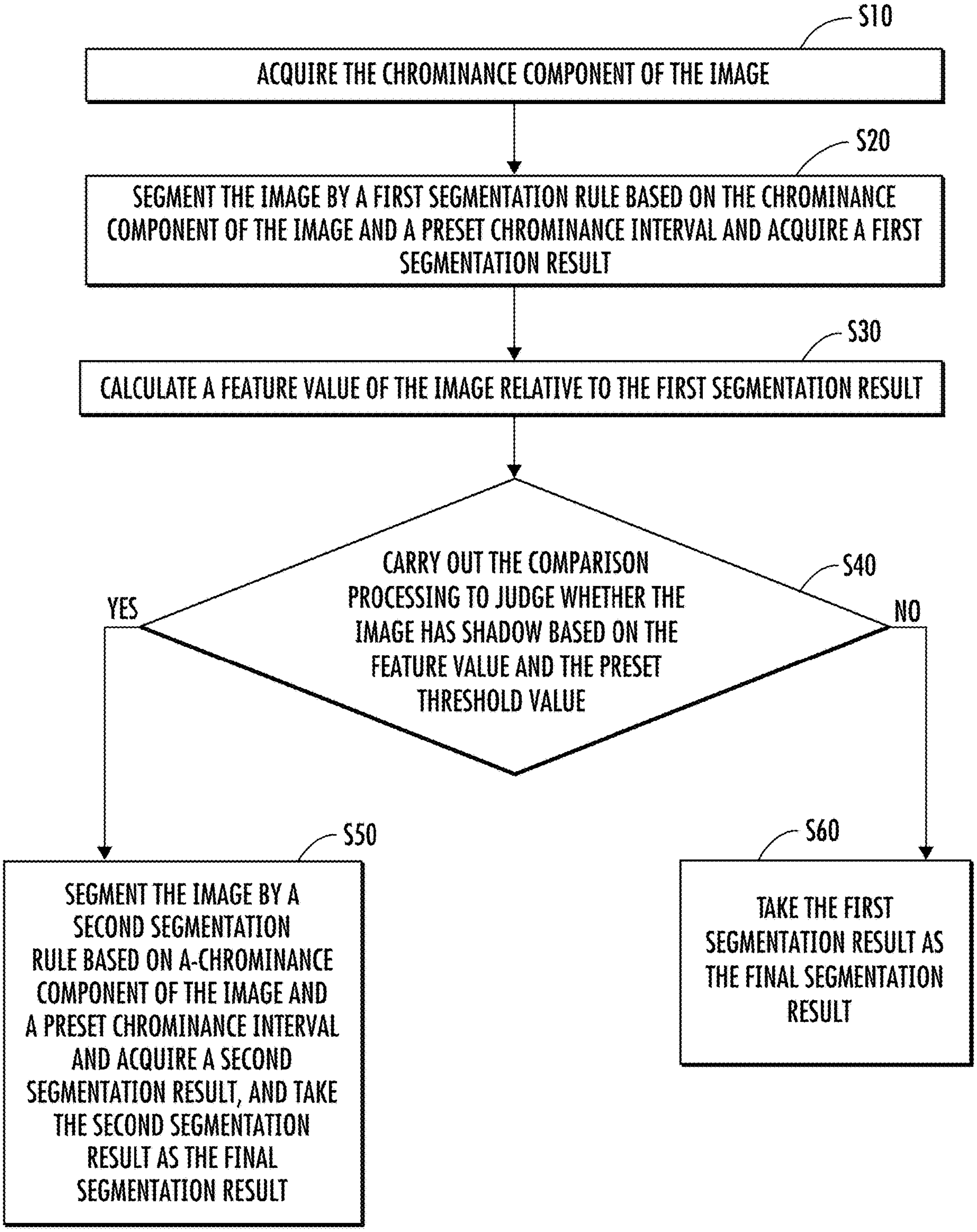
FIG. 2 is a flowchart of a second embodiment of the image shadow detection method of the present disclosure.

Referring to FIG. 2, in another embodiment of the present disclosure, the judgment result of S40 provides a basis for subsequent image processing. After S40, the following image processing further comprises: carrying out corresponding image processing based on the judgment result, and the subsequent image processing comprising acquiring corresponding final segmentation result based on the judgment result, or selecting corresponding image adjustment parameters to further process the image, wherein the specific flow of image segmentation by judging the result is as follows, and the image shadow detection method comprises the following steps:

S10: acquiring the chrominance component of the image;

S20: segmenting the image by a first segmentation rule based on the chrominance component of the image and a preset chrominance interval and acquiring a first segmentation result;

S30: calculating a feature value of the image relative to the first segmentation result;

S40: carrying out the comparison processing to judge whether the image has shadow based on the feature value and the preset threshold value; if the judgment result is that there is a shadow, executing S50; if the judgment result is that there is no shadow, executing S60;

S50: segmenting the image by a second segmentation rule based on a chrominance component of the image and a preset chrominance interval and acquiring a second segmentation result, and taking the second segmentation result as the final segmentation result;

S60: taking the first segmentation result as the final segmentation result.

In another embodiment of the present disclosure, the feature value comprises any one or a combination of: a first average luminance value of the first region, a second average luminance value of the second region, a luminance difference between the first average luminance value and the second average luminance value, a first roughness value of the first region, a second roughness value of the second region, or a roughness ratio of the first roughness value and the second roughness value, and each feature value is provided with a corresponding preset threshold value, wherein, the carrying out the comparison processing to judge whether the image has shadow based on the feature value and the preset threshold carrying out the comparison processing based on each feature value and the corresponding preset threshold value, and judging whether the image has a shadow based on any comparison result or a combination comparison result.

In another embodiment of the present disclosure, the S10 comprises:

acquiring HSV image;

carrying out the separation processing on the HSV image and acquiring an H-channel image and a V-channel image, wherein the H-channel image comprises a chrominance component and the V-channel image comprises a luminance component.

Figure 3:
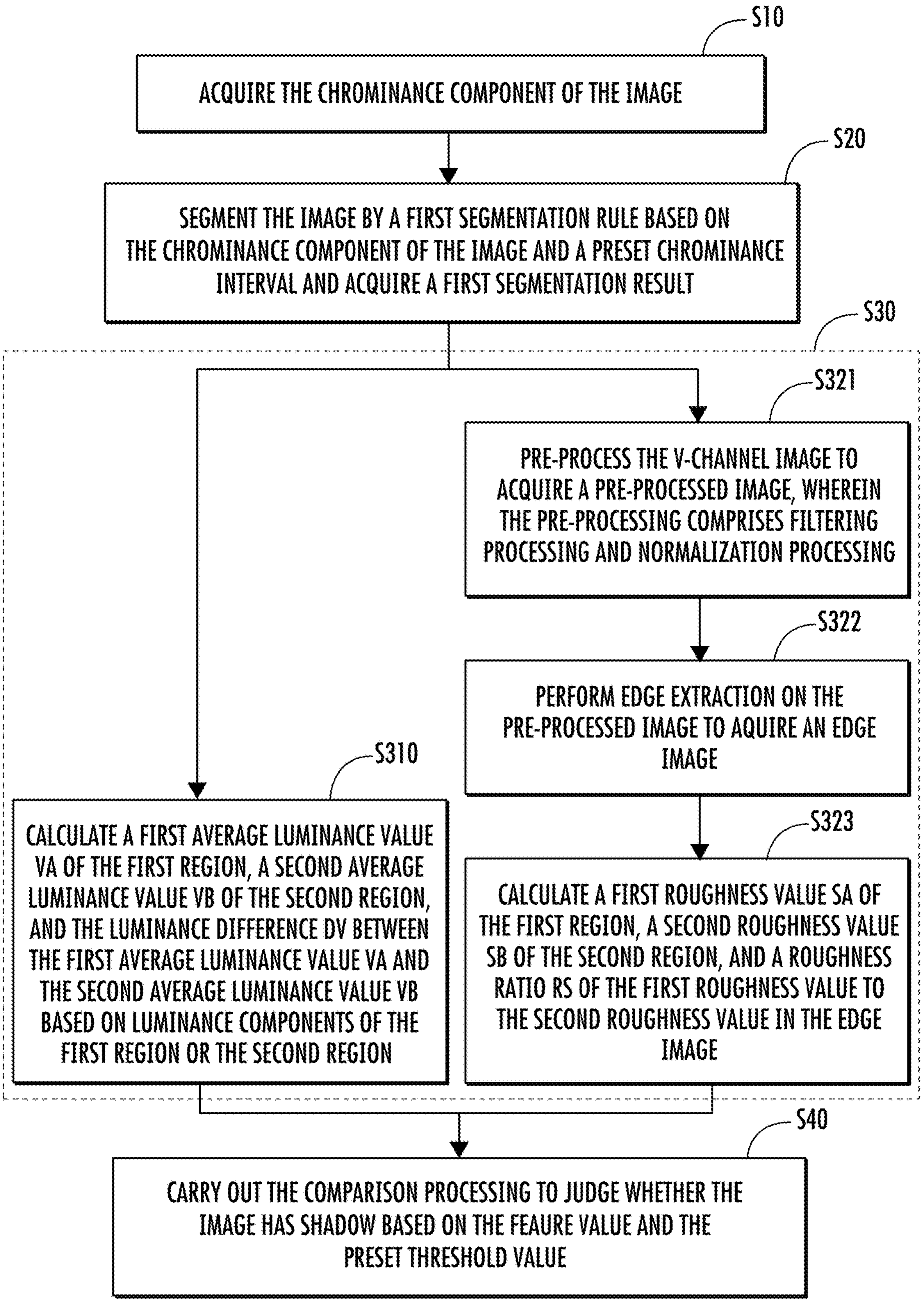
FIG. 3 is a flowchart of a third embodiment of the image shadow detection method of the present disclosure.

Referring to FIG. 3, in another embodiment of the present disclosure, S30 comprises:

S310: calculating a first average luminance value Va of the first region, a second average luminance value Vb of the second region, and the luminance difference Dv between the first average luminance value Va and the second average luminance value Vb based on luminance components of the first region or the second region.

In another embodiment of the present disclosure, the S30 comprises:

S321: pre-processing the V-channel image to acquire a pre-processed image, wherein the pre-processing comprises filtering processing and normalization processing;

S322: performing edge extraction on the pre-processed image to acquire an edge image;

S323: calculating a first roughness value Sa of the first region, a second roughness value Sb of the second region, and a roughness ratio Rs of the first roughness value to the second roughness value in the edge image.

Referring to FIG. 4, in another embodiment of the present disclosure, S20 comprises:

S201, generating a first color component histogram based on the chrominance component;

S202: filtering and smoothing the first color component histogram to acquire a second color component histogram;

S203: determining the peak and the valley in the second color component histogram based on the preset chrominance interval and the preset peak and valley setting conditions;

S204: acquiring a first segmentation threshold based on the peak and the valley;

S205: segmenting the image based on a first segmentation threshold and acquiring a first segmentation result.

In another embodiment of the present disclosure, the preset chrominance interval in the S30 may be determined according to needs, and different preset chrominance intervals are set for different use scenarios. For example, the preset chrominance interval may be set to 15-95 when the image is used for lawn identification after segmented by the image segmentation method based on chrominance components according to the present disclosure.

In another embodiment of the present disclosure, the preset peak and valley setting conditions in S30 comprise:

preset peak-valley setting condition 1: peak frequency>k*valley frequency, where k is a constant, comprising positive integer, fraction, or decimal, etc.;

preset peak-valley setting condition 2: the distance between adjacent peaks conforms to the preset distance between peaks;

preset peak-valley setting condition 3: peak frequency>frequency threshold.

The peaks and valleys in the chrominance component histogram are determined only when the preset peak-valley setting conditions 1, 2 and 3 are simultaneously satisfied. If the preset peak-valley setting condition 1 and the preset peak-valley setting condition 3 are satisfied, but the preset peak-valley setting condition 2 is not satisfied, the peak with the largest peak frequency is selected as the peak in the chrominance component histogram, and the remaining peaks are not regarded as the peaks in the chrominance component histogram.

Figure 5:
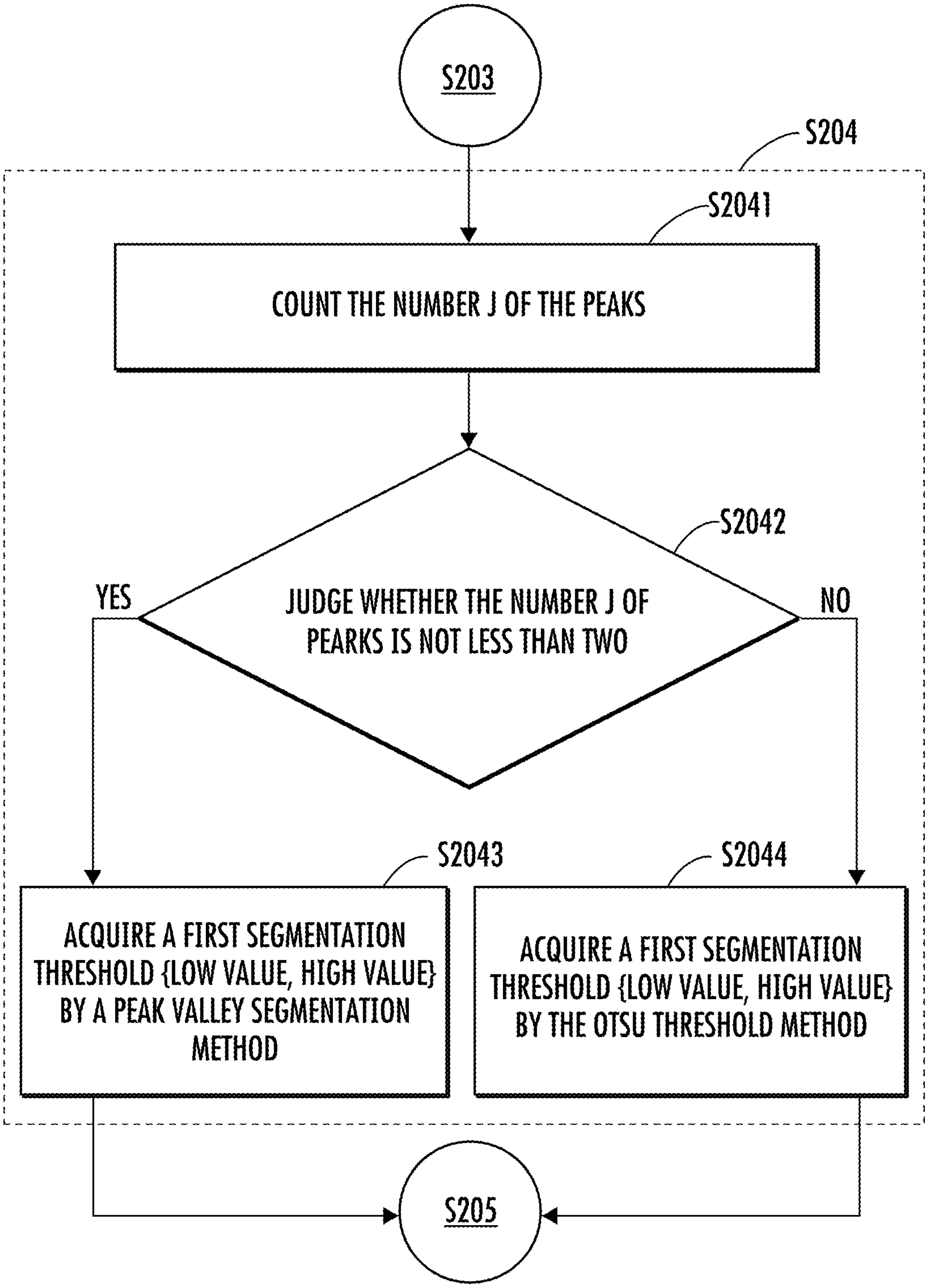
FIG. 5 is a flowchart of S204 in FIG. 4.

Referring to FIG. 5, in another embodiment of the present disclosure, S204 comprises:

S2041: counting the number of the peaks;

S2042: judging whether the number of peaks is not less than two; executing S2043 if the number of peaks is not less than two; executing S2044 if the number of peaks is less than two;

S2043: acquiring a first segmentation threshold [lowValue, highValue] by a peak-valley segmentation method;

S2044: acquiring a first segmentation threshold [lowValue, highValue] by the OTSU threshold method.

In another embodiment of the present disclosure, S2043 comprises:

finding a group of peaks and valleys with the largest peak-valley ratio from the peaks and valleys as target peaks and valleys, and acquiring the position of the valleys in the target peaks and valleys as the first position;

finding a second position of the maximum peak and valley of the left side on the left side of the first position, finding a third position of the maximum peak and valley of the right side on the right side of the first position, acquiring a chrominance value corresponding to the second position as a second peak chrominance value h1*i*, and acquiring a chrominance value corresponding to the third position as a third peak chrominance value h2*i*;

finding a chrominance value corresponding to the minimum frequency value between the second position and the third position as a segmentation chrominance value li;

A first segmentation threshold value [lowValue, highValue] is acquired from the second peak chrominance value h1*i*, the third peak chrominance value h2*i* and the segmentation chrominance value li. A comparison process is performed based on the second peak chrominance value h1*i* and a preset second peak threshold value, and the third peak chrominance value h2*i* and the preset third peak threshold value to acquire a peak chrominance value comparison result, and a first segmentation threshold value [lowValue, highValue] is acquired based on the peak chrominance value comparison result.

When the comparison result of the peak chrominance value satisfies "the second peak chrominance value h1*i*>the preset second peak threshold value and the third peak chrominance value h2*i*>the preset third peak threshold value", the minimum value of the preset chrominance interval (which may also be other values of the preset chrominance interval) is set as the minimum value lowValue of the first segmentation threshold, and the segmentation chrominance value li is set as the maximum value highValue of the first segmentation threshold.

When the peak chrominance value comparison result does not satisfy "the second peak chrominance value h1*i*>the preset second peak threshold value, and the third peak chrominance value h2*i*>the preset third peak threshold value", the segmentation chrominance value li is set as the minimum value lowValue of the first segmentation threshold, and the maximum value of the preset chrominance interval (which may also be other values of the preset chrominance interval) is set as the maximum value highValue of the first segmentation threshold.

For example, when the preset chrominance interval [15, 95], the preset second peak threshold value=30, and the preset third peak threshold value=75, lowValue=15 and highValue=li if h1*i*>30 and h2*i*>75 (large peak is bluish); otherwise, lowValue=li, highValue=95.

The first segmentation result in the S20 comprises a first region and a second region via the segmentation processing by the first segmentation threshold [lowValue, highValue], wherein the chrominance value corresponding to one of the first region and the second region is within the range of a first segmentation threshold [lowValue, highValue], and the chrominance value corresponding to the another region of the first region and the second region is within the range of a preset chrominance interval and the chrominance value is not within the range of the first segmentation threshold [lowValue, highValue]. Assuming a preset chrominance interval [15, 95], a first segmentation threshold [lowValue, highValue], wherein lowValue=15 and highValue=li; then the first region is a region with a chrominance value of [15, li] and the second region is a region with a chrominance value of [li, 95].

In another embodiment of the present disclosure, if the number of peaks j is less than two, the segmentation chrominance value li is acquired using the OTSU threshold method (OTSU), and a first segmentation threshold [lowValue, highValue] is acquired based on the number of peaks.

In order to accurately segment the specific chrominance region in the preset chrominance interval in the image, the lowest boundary point is searched from the minimum value of the preset chrominance interval, and if the lowest boundary point exists, the second peak chrominance value and the third peak chrominance value are preset by the first preset rule; if there is no lowest boundary point, the second peak chrominance value and the third peak chrominance value are preset by the second preset rule. Wherein, the chrominance value of the lowest boundary point is mi, and the frequency corresponding to mi is greater than the frequency corresponding to mi+1 and mi+2. Taking lawn image segmentation as an example, the chrominance value of some grasses in lawn is located in the yellow-red degree range (specific chrominance). By finding the lowest boundary point, the yellow-red degree grasses may be avoided from being segmented into non-grass areas after segmentation.

If there is a lowest boundary point, the second peak chrominance value and the third peak chrominance value are preset based on the number of peaks by the first preset rule. When the number of peaks is 0, the second peak chrominance value h1*i* is set to the lowest boundary point chrominance value mi, and the third peak chrominance value h2*i* is set to the maximum value of the preset chrominance interval (may also be other values of the preset chrominance interval). When the number of peaks is 1, the chrominance value of the peaks is h1, the second peak chrominance value h1*i* is set to the lowest boundary point chrominance value, and the third peak chrominance value is set to h1.

If there is no lowest boundary point, the second peak chrominance value h1*i* and the third peak chrominance value h2*i* are preset based on the number of peaks by a second preset rule. When the number of peaks is 0, the second peak chrominance value h1*i* is set to a minimum value of a preset chrominance interval (or other value of the preset chrominance interval), and the third peak chrominance value h2*i* is set to a maximum value of the preset chrominance interval (or other value of the preset chrominance interval). When the number of peaks is 1, the chrominance value of the peaks is h1, the second peak chrominance value h1*i* is set to h1, and the third peak chrominance value is set to h1.

When the number of peaks is 0, the segmentation chrominance value li, the second peak chrominance value h1*i*, and the third peak chrominance value h2*i* are compared to acquire the peak chrominance value comparison result, and a first segmentation threshold value is acquired based on the peak chrominance value comparison result.

When the number of peaks is 0, the comparison results comprise:

1-1 When the peak chrominance value comparison result satisfies the "segmentation chrominance value li>the third peak chrominance value h2*i*", the segmentation chrominance value li is set as the minimum value lowValue of the first segmentation threshold, and the maximum value of the preset chrominance interval (or other values of the preset chrominance interval) is set as the maximum value highValue of the first segmentation threshold.

1-2 When the peak chrominance value comparison result satisfies the "segmentation chrominance value li<second peak chrominance value h1*i*", the minimum value of the preset chrominance interval (or other values of the preset chrominance interval) is set as the minimum value lowValue of the first segmentation threshold, and the segmentation chrominance value li is set as the maximum value highValue of the first segmentation threshold.

1-3 When the peak chrominance value comparison result satisfies "second peak chrominance value h1*i* segmentation chrominance value li third peak chrominance value h2i", the second peak chrominance value h1i is set as the minimum value lowValue of the first segmentation threshold, and the third peak chrominance value h2i is set as the maximum value highValue of the first segmentation threshold.

When the number of peaks is 1, the second peak chrominance value h1i is compared with a preset second peak threshold value, and the third peak chrominance value h2i is compared with a preset third peak threshold value to acquire a peak chrominance value comparison result, and a first segmentation threshold value is acquired based on the peak chrominance value comparison result. The comparison process in which the number of peaks is 1 is the same as the comparison process in which the number of peaks j is not less than 2, referring to the specific procedure of S2043.

The second segmentation rule is different from the first segmentation rule. The second segmentation rule segments the image through a second segmentation threshold, The second segmentation threshold is a fixed threshold, for example, the minimum value lowValue of the second segmentation threshold is the minimum value of the preset chrominance interval (or other values of the preset chrominance interval), and the maximum value highValue of the second segmentation threshold is the maximum value of the preset chrominance interval (or other values of the preset chrominance interval).

In another embodiment of the present disclosure, the S40 comprises:

- carrying out comparison processing based on the feature value and the preset threshold value to acquire a feature value comparison result;
- acquiring a peak chrominance value comparison result based on the comparison processing of the second peak chrominance value and the preset second peak threshold value, and of the third peak chrominance value and the preset third peak threshold value;
- determining whether the image has a shadow by combining the feature value comparison result with the peak chrominance value comparison result.

Whether a shadow exists in an image is judged based on any one of the feature values or a combination thereof. The combination of the feature values used for judging the shadow may be determined according to the need. For example, the combination of part of the feature values is taken as the judgment basis:

Judgment basis: 1: h1i>34 and h2i<75 (color region being green range) and dv>45;

Judgment basis 2: Vb<50 and Dv>40;

Judgment basis 3: Rs<2, Dv>35 and Sa>0.1.

The image shadow detection method of the present disclosure comprises a plurality of judgment basis. Each judgment basis comprises any one or combination of feature values, and if any judgment basis or a plurality of judgment basis is met, the image has shadow; if any judgment basis is not met, there is no shadow in the image.

Referring to FIG. 6, the present disclosure also provides a method for detecting the shadow of a lawn image, comprising the following steps:

- S110: acquiring the chrominance component of lawn image;
- S120: segmenting the lawn image by a first segmentation rule based on the chrominance component of the lawn image and a preset lawn chrominance interval and acquiring a first segmentation result;
- S130: calculating a feature value of the lawn image relative to the first segmentation result;
- S140: carrying out the comparison processing to judge whether the image has shadows based on the feature value and the preset threshold value.

Figure 7:
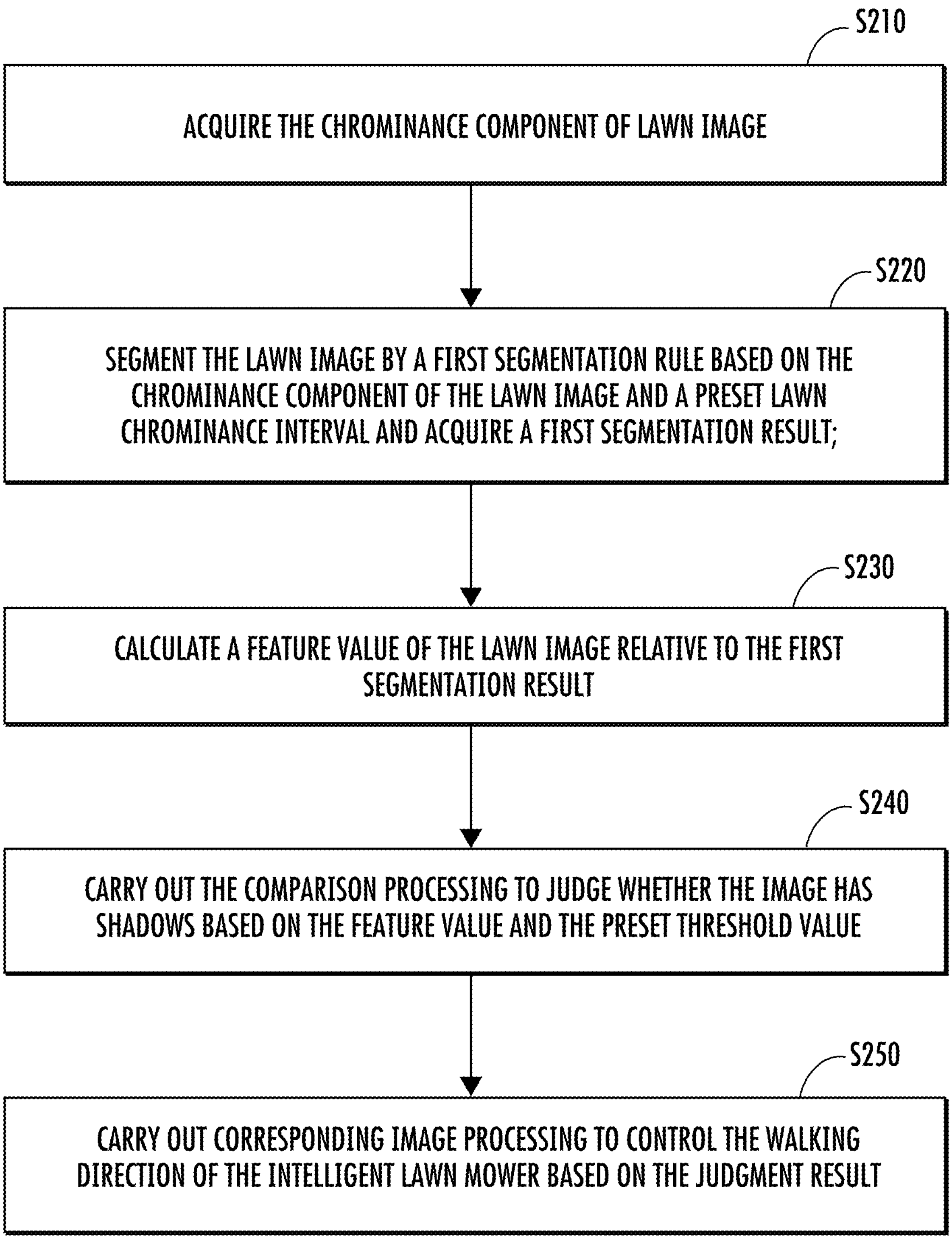
FIG. 7 is a flowchart of the walking control method of the intelligent lawn mower of the present disclosure.

Referring to FIG. 7, the present disclosure also provides a walking control method of an intelligent lawn mower, comprising the following steps:

- S210: acquiring the chrominance component of lawn image;
- S220: segmenting the lawn image by a first segmentation rule based on the chrominance component of the lawn image and a preset lawn chrominance interval and acquiring a first segmentation result;
- S230: calculating a feature value of the lawn image relative to the first segmentation result;
- S240: carrying out the comparison processing to judge whether the image has shadows based on the feature value and the preset threshold value;
- S250: carrying out corresponding image processing to control the walking direction of the intelligent lawn mower based on the judgment result.

Figure 8:
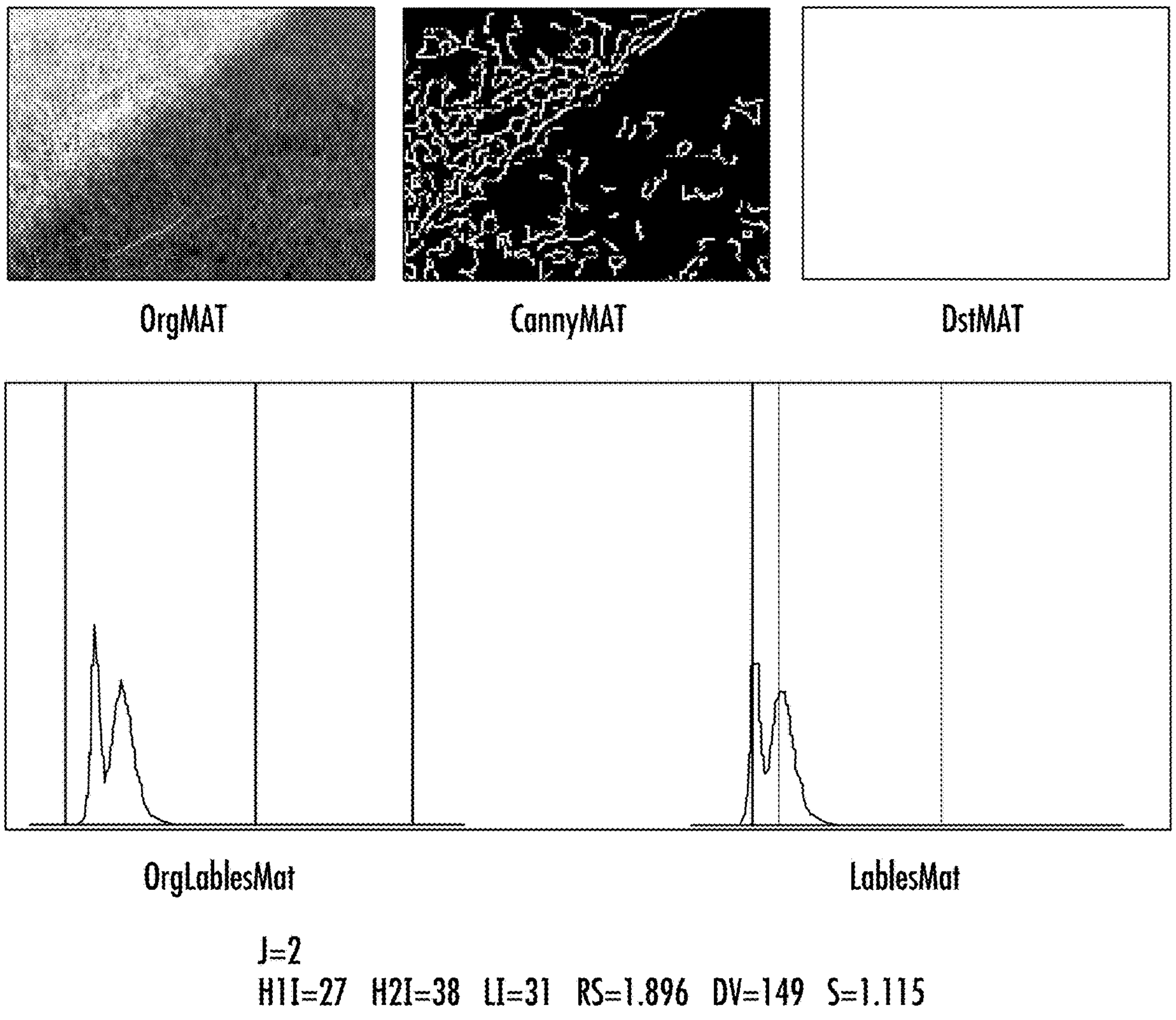
FIG. 8 is a result graph of detecting whether a shadow exists in a first image and performing an image segmentation process according to an image shadow detection method of the present disclosure.
Figure 9:
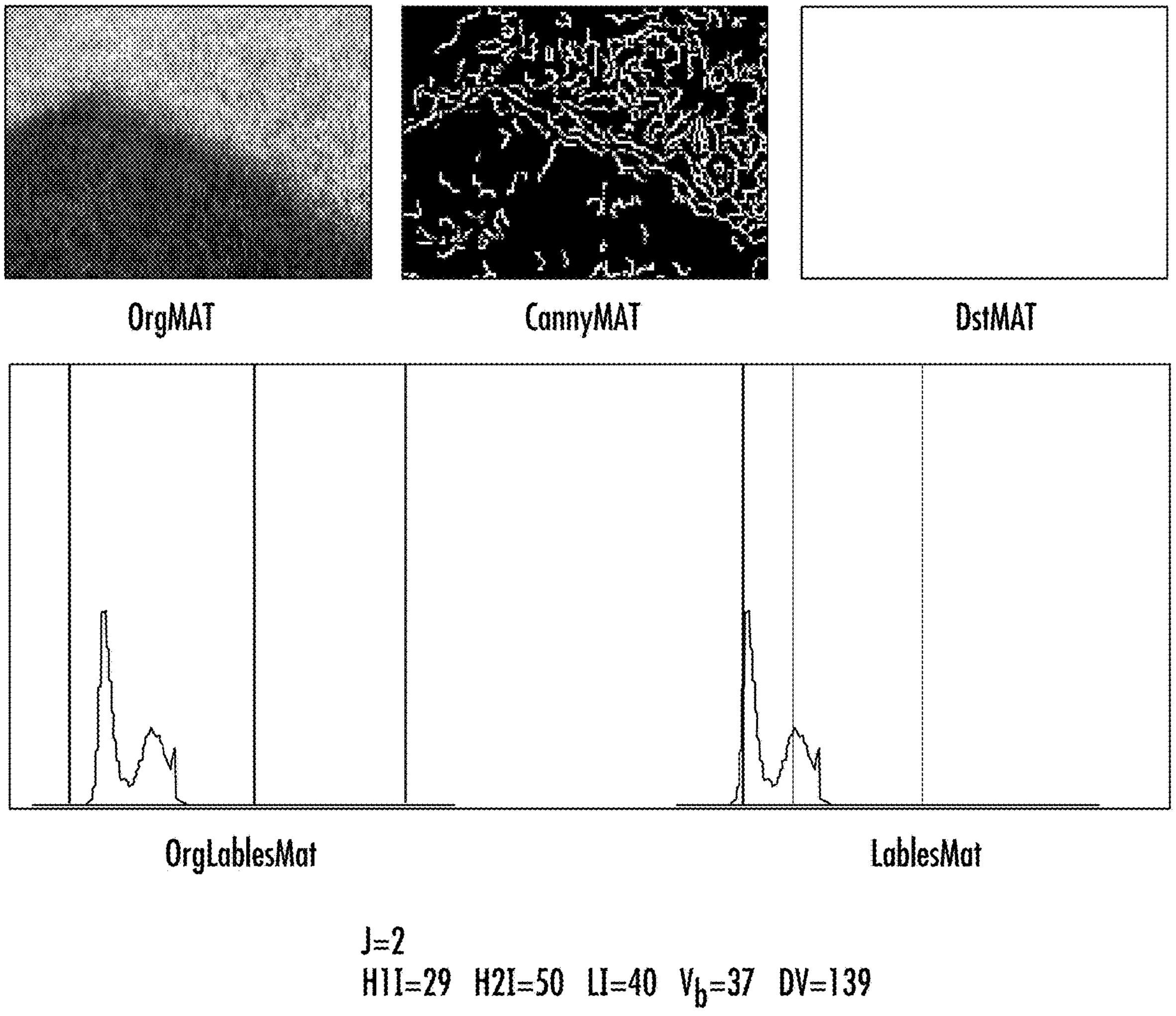
FIG. 9 is a result graph of detecting whether a shadow exists in a second image and performing an image segmentation process according to an image shadow detection method of the present disclosure.
Figure 10:
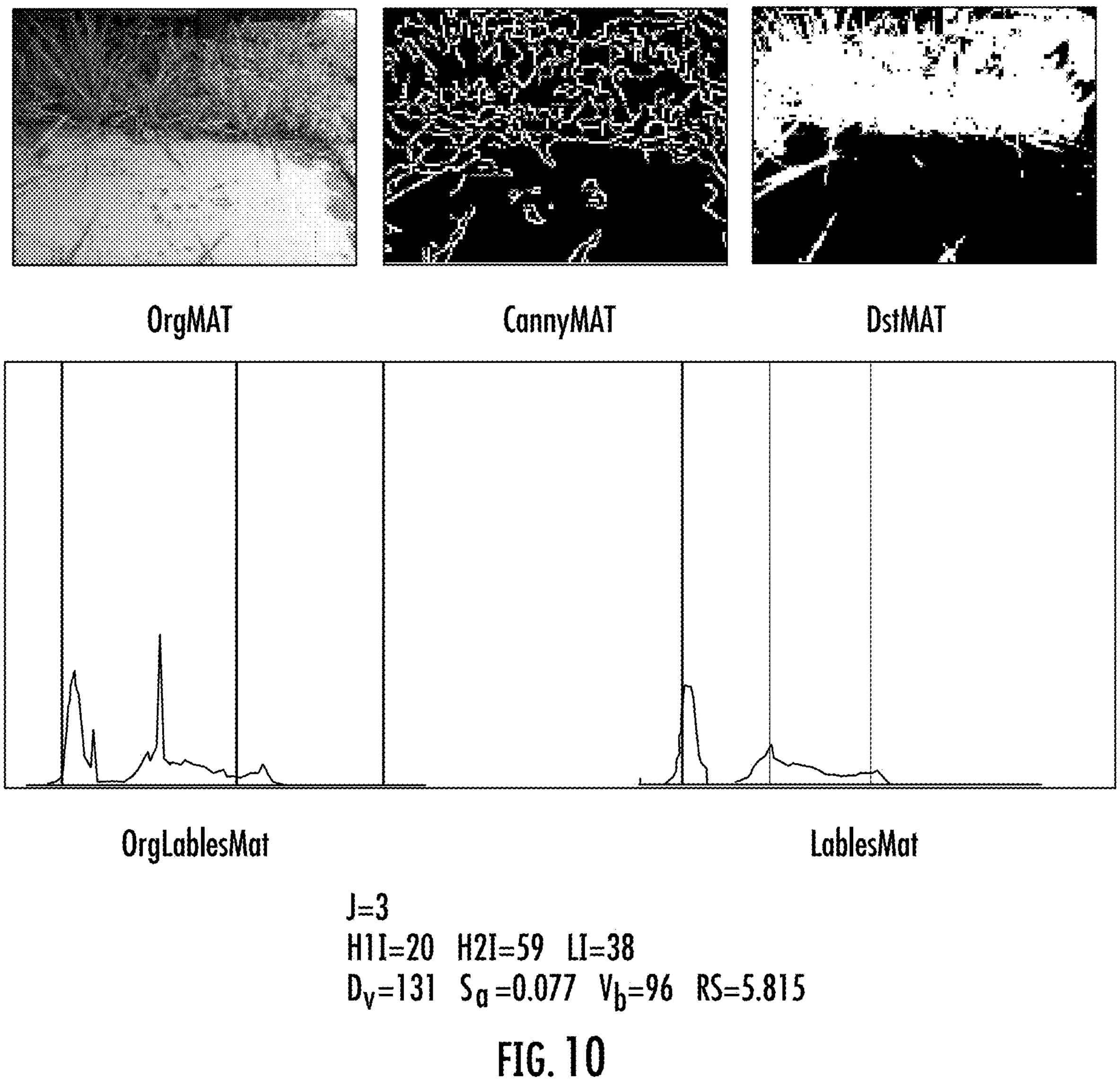
FIG. 10 is a result graph of detecting whether a shadow exists in a third image and performing image segmentation processing according to an image shadow detection method of the present disclosure.

Referring to FIGS. 8-10, assuming a preset chrominance interval [15, 95], the first segmentation rule may refer to FIGS. 4 and 5, and a first segmentation result maybe acquired. After the image orgMat in S10 is separated to acquire an H channel image, a first chrominance component histogram orgLabelsMat is generated in S201, and a second chrominance component histogram labelsMat is generated in S202; the peaks and valleys are identified by S203, and the first segmentation threshold and the first segmentation result dstMat are acquired by S2043 or S2044.

After acquiring the first segmentation result dstMat, a partial feature value (luminance feature value) based on the first segmentation result and the luminance component is acquired in S310, an edge image cannyMat is acquired in S322, and a partial feature value (roughness feature value) based on the first segmentation result and the edge image cannyMat is acquired in S323.

After acquiring the feature value, whether there is a shadow may be judged based on the feature value. When there is a shadow (as shown in FIGS. 8 and 9), a second segmentation result is acquired by a second segmentation rule (for example, by a second segmentation threshold [15, 95]) and the second segmentation result is determined as a final segmentation result dstMat; when there is no shadow (as shown in FIG. 10) the first segmentation result is taken as the final segmentation result dstMat.

Figure 11:
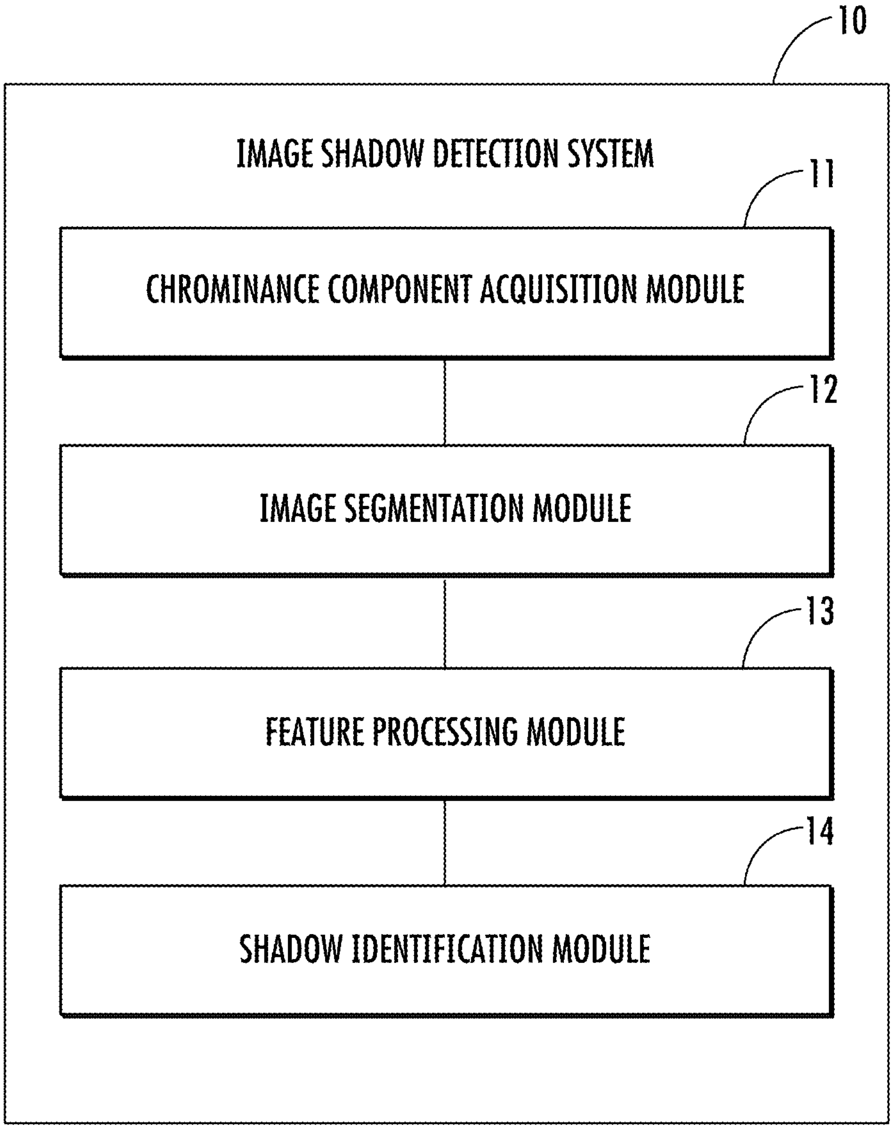
FIG. 11 is a block diagram of the principle of the image shadow detection system of the present disclosure.

Referring to FIG. 11, the present disclosure also provides an image shadow detection system 10 comprising:

- a chrominance component acquisition module 11, for acquiring a chrominance component of an image;
- an image segmentation module 12, for segmenting the image by a first segmentation rule based on a chrominance component of the image and a preset chrominance interval and acquiring a first segmentation result;
- a feature processing module 13, for calculating a feature value of the image relative to the first segmentation result;
- a shadow identification module 14, for carrying out the comparison processing based on the feature value and the preset threshold value to judge whether the image has shadows.

The present disclosure also provides an image processing device, comprising a memory and a processor, the memory storing a computer program, and the processor implementing the steps of the image shadow detection method when executing the computer program.

The present disclosure also provides a readable storage medium, storing a computer program thereon, executing the steps of the image shadow detection method when the computer program is executed by the processor.

To sum up, According to the present disclosure, segmentation processing is performed on an image by a first segmentation rule and a first segmentation result is acquired, wherein the first segmentation result is acquired based on a chrominance component and is not affected by shadows, and the shadow area is identified by combining the first segmentation result with the judgment of feature values, thus reducing the possibility of shadow misjudgment. According to the disclosure, corresponding image processing is carried out based on the judgment result, segmentation processing is carried out by selecting the second segmentation rule under the condition of shadow, and segmentation processing is carried out by selecting the first segmentation rule under the condition of no shadow, so that the final segmentation result is not affected by shadow and the possibility of false segmentation is reduced. According to the present disclosure, whether the image has shadow is judged by the combination comparison result of a plurality of feature values, thereby reducing the possibility of shadow misjudgment. According to the present disclosure, the segmentation threshold is acquired based on the peak and the valley, the segmentation threshold may be dynamically adjusted based on different images, and the fixed segmentation threshold is no longer used, thereby effectively reducing false segmentation. According to the present disclosure, filtering processing and smoothing processing is performed on the chrominance component histogram, interference signals in the chrominance component histogram is reduced, thereby further reducing false segmentation. According to the present disclosure, the peak and the valley in the chrominance component histogram is determined based on the preset chrominance interval and the preset peak-valley setting conditions, so as to improve the speed of identifying the peak and the valley.

In addition, it should be understood that, while this specification is described in accordance with embodiments, each embodiment does not contain only an independent technical solution, and the description is only for clarity. Those skilled in the art should take the description as a whole, and the technical solutions in each embodiment may be suitably combined to form other embodiments that may be understood by those skilled in the art.

The series of detailed descriptions set forth above are intended to be specific to feasible embodiments of the present disclosure only and are not intended to limit the scope of protection of the present disclosure, and any equivalent embodiments or modifications made without departing from the technical spirit of the present disclosure should be falling within the scope of protection of the present disclosure.

The invention claimed is:

1. A method of detecting a shadow in an image of a lawn, the method comprising the following steps:

acquiring a chrominance component of the image of the lawn;

segmenting the image by a first segmentation rule based on the chrominance component of the image and a preset chrominance interval and acquiring a first segmentation result;

calculating a feature value of the image relative to the first segmentation result;

carrying out comparison processing to obtain a judgement result as to whether the image has a shadow based on the feature value and a preset threshold value;

carrying out image processing based on the judgment result, wherein:

if the judgment result is that a shadow exists, segmenting the image by a second segmentation rule based on the chrominance component of the image and a preset chrominance interval to acquire a second segmentation result, and taking the second segmentation result as a final segmentation result; and if the judgment result is that no shadow exists, taking the first segmentation result as the final segmentation result;

wherein the first segmentation result comprises a first region and a second region, and the feature value comprises a first roughness value of the first region, a second roughness value of the second region, and the roughness ratio of the first roughness value and the second roughness value, and each feature value is provided with a corresponding preset threshold value; and wherein the carrying out the comparison processing to judge whether the image has a shadow based on the feature value and the preset threshold value comprises comparison processing based on each feature value and the corresponding preset threshold value, and judging whether the image has a shadow based on any comparison result or a combination comparison result, the judging whether the image has a shadow indicating whether the image is a grass area or a non-grass area.

2. The method according to claim 1, wherein the acquiring the chrominance component of the image step comprises:

acquiring HSV image; and carrying out separation processing on the HSV image and acquiring an H-channel image and a V-channel image, wherein the H-channel image comprises a chrominance component and the V-channel image comprises a luminance component.

3. The method according to claim 2, wherein the calculating a feature value of the image relative to the first segmentation result step comprises: calculating a first average luminance value of the first region, a second average luminance value of the second region, and the luminance difference between the first average luminance value and the second average luminance value based on luminance components of the first region or the second region.

4. The method according to claim 2, wherein the calculating a feature value of the image relative to the first segmentation result step comprises:

pre-processing the V-channel image to acquire a pre-processed image, wherein the pre-processing comprises filtering processing and normalization processing;

performing edge extraction on the pre-processed image to acquire an edge image; and calculating a first roughness value of the first region, a second roughness value of the second region, and a roughness ratio of the first roughness value to the second roughness value in the edge image.

5. A walking control method of an intelligent lawn mower, comprising the following steps:

detecting whether a shadow exists in an image of a lawn by performing the steps of the method of claim 1; and controlling a walking direction of the intelligent lawn mower based on the judgement result.

6. An image shadow detection system comprising:
- a chrominance component acquisition module for acquiring a chrominance component of an image;
- an image segmentation module for segmenting the image by a first segmentation rule based on the chrominance component of the image and a preset chrominance interval and acquiring a first segmentation result;
- a feature processing module for calculating a feature value of the image relative to the first segmentation result; and
- a shadow identification module for carrying out a comparison processing to judge whether the image has shadows based on the feature value and a preset threshold value, wherein operation of the system causes the steps of the image shadow detection method according to claim 1 to be implemented.

7. An image processing apparatus, comprising a memory and a processor, the memory having a computer program stored therein, wherein when the processor executes the computer program the apparatus implements the steps of the image shadow detection method of claim 1.

8. A non-transitory computer readable storage medium, having stored therein a computer program, wherein when executed by a processor, the computer program implements the steps of the image shadow detection method of claim 1.

9. The method according to claim 1, wherein the feature value further comprises a first average luminance value of the first region, a second average luminance value of the second region, or a luminance difference between the first average luminance value and the second average luminance value.

* * * * *